United States Patent [19]

Ershler

[11] 3,947,657

[45] Mar. 30, 1976

[54] MULTIPURPOSE FOLDABLE ELECTRIC STOVE

[76] Inventor: Samuel H. Ershler, 1050 Fifth Ave., New York, N.Y. 10028

[22] Filed: June 17, 1975

[21] Appl. No.: 587,669

[52] U.S. Cl. .................... 219/454; 99/340; 99/400; 126/9 R; 219/340; 219/458; 219/474; 219/521
[51] Int. Cl.² ... H05B 3/68; A47J 37/00; F24C 7/10
[58] Field of Search .......... 219/200, 201, 340, 342, 219/346, 347, 348, 354, 361, 385, 386, 393, 443, 454, 458–461, 472–475, 520–522, 524, 532; 126/9 R, 9 B, 9 A, 41 R; 99/339, 340, 385, 393–401, 447–449

[56] References Cited
UNITED STATES PATENTS

| | | | |
|---|---|---|---|
| 977,580 | 12/1910 | Abtmeyer | 219/521 |
| 1,167,095 | 1/1916 | Murray | 219/532 X |
| 1,220,781 | 3/1917 | Parkhurst | 219/443 X |
| 1,263,927 | 4/1918 | Rice | 99/339 UX |
| 1,436,657 | 11/1922 | Ingersoll | 219/521 X |
| 1,484,476 | 2/1924 | Currie | 126/9 B |
| 1,645,327 | 10/1927 | Hirshfeld et al. | 219/521 |
| 1,652,745 | 12/1927 | Tannenbaum et al. | 219/459 |
| 1,959,198 | 5/1934 | Conry | 126/9 R |
| 2,216,457 | 10/1940 | Salisbury | 99/450 X |
| 2,740,880 | 4/1956 | Mead | 219/454 X |

*Primary Examiner*—A. Bartis
*Attorney, Agent, or Firm*—Kenyon & Kenyon Reilly Carr & Chapin

[57] ABSTRACT

A multipurpose foldable electric stove comprises a tray of heat-conductive metal that has an electrical-resistance heating element disposed thereacross between opposite walls of the tray and in spaced relation to a grill having support legs supported by the tray and foldable legs that are hingedly foldable from position substantially flush with the top of the grill and position in unfolded upstanding position in excess of 90° from the plane of the grill, stop means being provided which is adapted to prevent unfolding beyond said upstanding position so that when foldable legs are unfolded to upstanding position and said tray is inverted said heating element is held spaced from the support on which the foldable legs rest for heating something placed underneath the heating element while at the same time something may be heated that is resting in the inverted bottom of said tray. A pan also is provided for placing underneath said tray when in inverted position for holding something to be heated therein.

10 Claims, 9 Drawing Figures

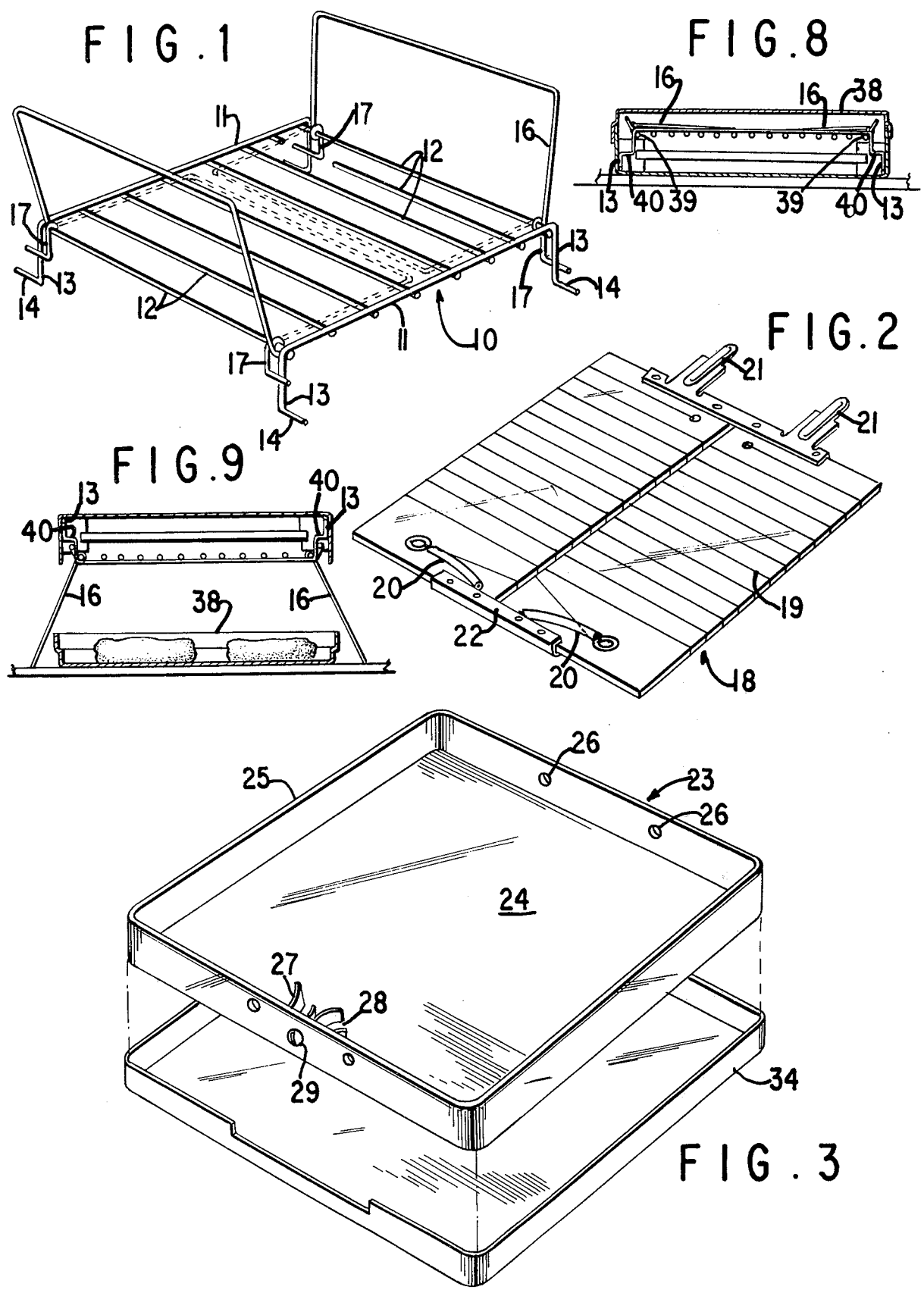

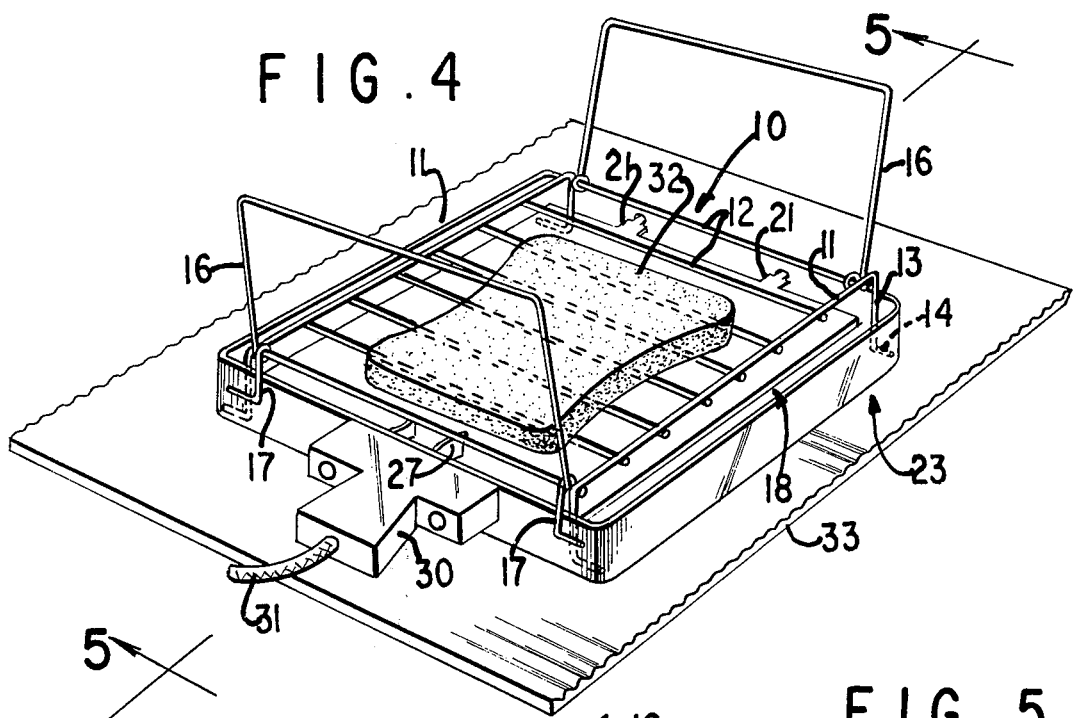
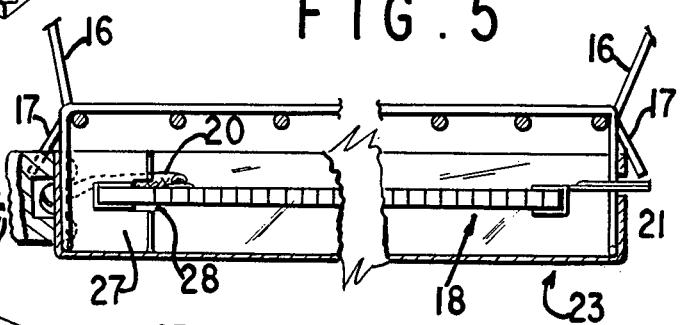
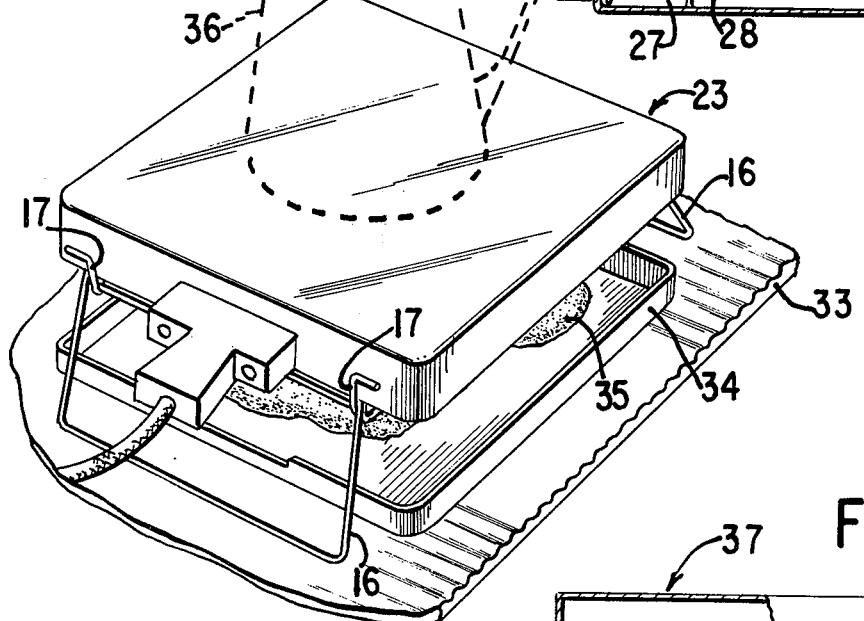
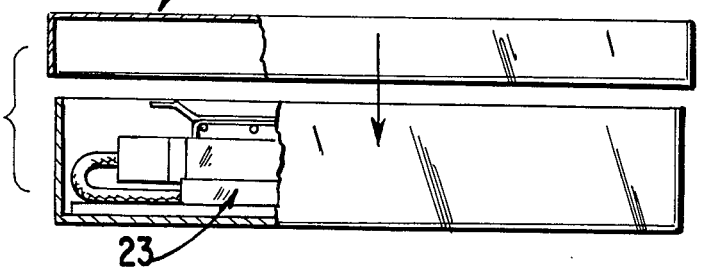

MULTIPURPOSE FOLDABLE ELECTRIC STOVE

FIELD OF INVENTION

The invention relates to stoves and more particularly to a small portable electric stove having multipurpose utility.

BACKGROUND OF INVENTION

Especially for use when travelling, electric stoves heretofore have been proposed which are adapted for occasional use by being plugged into an available wall outlet, e.g., in a motel or hotel.

It is an object of this invention to provide an electric stove of the type referred to which possesses improved versatility of use combined with a simple compact foldable construction that lends itself to being carried in a suitcase or tote bag.

GENERAL STATEMENT OF INVENTION

According to this invention, the basic heating unit is in the form of a shallow tray which has an electrical-resistance heating element extending between opposite marginal walls thereof so as to be in adjacent spaced relation to the bottom of the tray. The bottom of the tray overall is flat in the sense that it may be rested on a flat surface and in the sense that an article such as a coffeepot may be rested on the bottom of the tray when the tray is inverted. However, when it is stated that the tray has an overall flat bottom this is not intended to exclude the possibility of there being a succession of ridges or depressions or apertures which are sufficiently small in relation to the overall extent of the bottom of the tray so as not to interfere with resting the tray on a suitable support or resting an article on the top of the bottom of the tray when the tray is inverted.

In spaced relation above the heating element there is a grill which may, for example, be in the form of a succession of substantially parallel bars which is held in position by supporting legs that rest on the bottom of the tray and that preferably are in such snug adjacent relation to the inner surfaces of the walls of the tray so as to minimize movement relative to the tray either laterally or at least to a certain extent so as to prevent the grill from accidentally falling out when inverting the tray. When the tray is right side up an article of food such as a piece of bread to be toasted may be placed on top of the grill and when the heating element is activated its proximity to the heating element will enable the bread to be toasted.

The stove of this invention also comprises foldable legs which are hingedly attached adjacent opposite ends of the grill. These legs may take various forms so long as they may be folded about appropriate hinges from position substantially flush with the surface of the grill to an upstanding position that is at an angle to the plane of the top of the grill that is slightly more than 90°. Suitable stop means are provided so as to limit the unfolding of the foldable legs beyond the upstanding position just described. When the top of the grill is being used for toasting a slice of bread, for example, as hereinabove mentioned, the foldable legs are normally folded about their hinges to the upstanding unfolded position so as to be out of the way. However, this is not absolutely essential in the case of use such as toasting a slice of bread.

The principal function of the foldable legs is that when in upstanding unfolded position they serve as legs which support the tray and the heating element, when the tray is inverted, so as to position the heating element substantially above the surface on which the unfolded foldable legs may be placed. When the stove is in this inverted position there normally is used therewith a pan which is adapted to rest on the support which supports the foldable legs so that the margins of the pan lie between the extremities of the foldable legs. The pan may be dimensioned so as to have approximately the same lateral dimensions as the tray.

When the stove is in inverted position including the underlying pan an article of food may be placed on the pan and cooked by actuating the heating element. For example, one may cook eggs or a patty of ground steak or bacon or other food item to be cooked. Alternatively, this space may be used to warm rolls or a bun of one kind or another. While the stove is being used to warm or cook something underneath the heating element that is disposed in the pan the bottom of the tray, which now faces upwardly, may be used to heat food or a beverage. For example, a container for coffee or for hot water to be used in making tea can be placed on the upturned surface of the bottom of the pan which is heated when the electrical-resistance heating element is turned on. In order to provide efficient conduction of heat through the bottom of the tray the bottom of the tray preferably is made of sheet aluminum having adequate structural strength such as 16 gauge sheet aluminum.

It is apparent from the foregoing that an electric stove is provided which lends itself very well to such purposes as travel for preparing a simple breakfast or to provide a snack at some other time which requires the employment of heat either for heating liquid or, for example, cooking. The tray ordinarily is square or rectangular but may be made in any desired shape. A stove wherein the tray is square measuring 6 × 6 inches has been found to be very useful when travelling. However, the stove may be made larger or smaller and in other shapes. Because the stove can be so readily folded so as to be only an inch or so in thickness, the stove when folded lends itself very well to being carried in a suitcase or tote bag. When one wishes to use it, all that is required is merely to plug it into any wall outlet that may be convenient. The stove may be carried in a case or by suitably dimensioning the pan in relation to the tray and the foldable legs the pan itself may serve as a cover for the foldable stove.

Further objects, features and advantages of this invention will be apparent in connection with the illustrative embodiments thereof shown in the accompanying drawings, wherein:

FIG. 1 is a perspective view of the grill element of the stove of this invention;

FIG. 2 is a perspective view of a typical electrical-resistance heating element which may be employed in the stove of this invention;

FIG. 3 is a perspective view of the tray and of the pan which is used underneath the heating element when the tray is in inverted position;

FIG. 4 is a perspective view of the tray right side up with the grill in place and indicating an article of food such as a piece of bread in position to be toasted;

FIG. 5 is a section on the line 5—5 of FIG. 4;

FIG. 6 is a perspective view of the stove with the tray inverted and illustrating the use of the stove in cooking food below the heating element and in heating a container resting on the upturned bottom of the tray;

FIG. 7 is a side elevation partly in section illustrating how the stove may be carried in a container therefor while travelling;

FIG. 8 is a sectional elevation of a modification of the stove of this invention wherein the pan is dimensioned relative to the tray and foldable legs so as to serve as a cover when the stove has been folded for travelling; and FIG. 9 is an elevation partly in section which shows the embodiment of FIG. 8 when unfolded with the tray inverted for cooking food in the tray positioned below the heating element.

In FIG. 1 the grill, which is indicated generally by the reference character 10, is shown as being provided by a frame comprising parallel side members 11 between which there is a succession of substantially parallel support bars 12. The side bars 11 are extended at each end so as to provide the fixed support legs 13 having feet 14 which are adapted and arranged to rest on the bottom of the tray 23 as shown in FIG. 4.

At each end of the grill the foldable legs 16 are provided. In the embodiment shown these legs are in the form of a U such that the bottom of the U is adapted to rest on a flat surface when the stove is inverted. The sides of the U are extended so as to wrap around the bars 12 at each end of the grill, thereby providing a hinge. This wrapped-around extension is extended further to provide the stop members 17 which limit the extent to which the foldable legs may be opened up. These legs are shown in opened up position in FIG. 1 in solid lines and in folded position in dotted lines. The stop members 17 are shown coacting with the support legs 13 in limiting the extent to which the foldable legs may be unfolded but similar functioning may be afforded as, for example, when the parts are dimensioned so that the stop members 17 strike the outer surface of the margin of the tray when the grill is in position in the tray. Various materials may, of course, be used for the grill so long as adequate heat resistance is provided. It has been found that 3/32-inch diameter stainless steel wire is well adapted not only for providing the desired functional utility but also in lending itself to ready fabrication.

The electrical-resistance heating element shown in FIG. 2 is conventional. A suitable form-maintaining sheet 18 of heat-resistant material, such as asbestos surfaced with a micaceous coating, may be used for supporting elongated electrical-resistance element 19 which is supplied with electricity from the heat-resistant lead-in wires 20. A pair of supports 21 is provided at one end and at the other end there is a support bar 22.

As shown in FIG. 3, the tray indicated generally by the reference character 23 may be of simple construction such as that shown comprising the overall flat bottom 24 and the upstanding marginal wall 25. The apertures 26 accommodate the support members 21 of the heating element and in opposed relation to the apertures 26 there is a holder 27 having a notch 28 therein in which the support plate 22 of the heating element fits. The holder 27 is detachable as by the screw 29 in order to permit assembly of the heating element.

In FIG. 4 the grill 10, the heating element and the tray 23 are shown in assembled relation with the support legs 13 resting on the bottom of the tray 23, the foldable legs 16 being in unfolded position. For convenience, a handle 30 may be attached to the wall of the tray adjacent the holder 27 and in the embodiment shown it is illustrated how the electric cord 31 may, if desired, be carried through the handle to the wires 20 that are connected to the electrical-resistance element. In FIG. 4 there is shown for purposes of illustration a slice 32 of bread in position to be toasted. Since the bottom of the pan becomes quite hot and since certain types of surface might be injured by heat, it is desirable when the stove is positioned on such a surface to interpose between the stove and the surface a sheet 33 of a suitable insulating material which may be carried along with the stove while travelling.

In FIG. 6 the tray 23 is shown inverted and supported by the foldable legs which are in unfolded position and which are held in position by the stop member 17 making contact with the wall of the tray. When the tray is in inverted position the pan 34 normally is used therewith overlying the sheet of insulating material 33.

In FIG. 6 a food to be cooked is indicated for the purposes of exemplification by the reference character 35. At the same time something to be heated, such as the coffeepot 36 which is indicated in dotted lines, may rest on the upturned bottom of the tray 23 so that the stove may be simultaneously used for cooking food disposed in the tray and heating a beverage such as coffee by the use of the upturned bottom of the tray, which also is heated.

In FIG. 7 the stove, such as that shown in FIGS. 1–6, is shown in folded position in a container 37 so as to illustrate how the stove may be carried in a suitable container that occupies very little space.

The embodiment of the invention shown in FIGS. 8 and 9 is similar to that shown in FIGS. 1–6 except that the pan 38 is made so that the margins of the side wall telescopically slide over the walls of the tray. In order to accommodate the foldable legs 16, they are hingedly attached to the grill at 39 spaced somewhat inwardly from the walls of the tray by virtue of an offset 40 in the support legs 13. In FIG. 8 the stove as thus constructed is shown in position with the pan 38 serving as a cover so that the stove may be carried in a single assembled unit without the necessity for a carrying package. In FIG. 9 this embodiment is shown in unfolded position with the tray inverted and the pan 38 disposed underneath the tray in spaced relation to the heating element.

While this invention has been described in connection with certain specific embodiments thereof, it is to be understood that this has been done for purposes of illustration and that the multipurpose foldable electric stove of this invention may be made in various sizes and shapes as may be desired.

I claim:

1. A multipurpose foldable electric stove which comprises:
    a tray having an overall flat bottom bordered by an upstanding marginal wall;
    an electric-resistance heating element extending between and supported by opposed portions of said wall in adjacent spaced relation to the bottom of said tray;
    a grill comprising a frame having a succession of spaced support bars extending thereacross and held in adjacent spaced relation to the upper side of said heating element by support legs the lower portions of which are disposed adjacent the inner surface of said wall with the extremities thereof supported by the bottom of said tray;

foldable legs hingedly secured adjacent opposite ends of said grill by a hinge means which permits opening said legs from folded position substantially flush with the upper surface of said grill to unfolded upstanding position in excess of 90° with respect to the upper surface of said grill; and stop means which limits the unfolding of said legs beyond said upstanding position, said foldable legs being adapted to support said tray substantially spaced from a support surface on which said legs are placed when said tray is inverted with said legs in unfolded position.

2. A multipurpose foldable electric stove according to claim 1 wherein said tray is substantially rectangular or square.

3. A multipurpose foldable electric stove according to claim 1 which additionally comprises a pan adapted for disposition in opposite spaced relation to said heating element between the extremities of said foldable legs when said tray is inverted.

4. A multipurpose foldable electric stove according to claim 3 wherein the margins of said pan are dimensioned to slide telescopically over the outer surface of the wall of said tray and wherein said foldable legs and said grill are dimensioned for permitting the margins of said pan to be slid over the outer surface of the wall of the tray when said foldable legs are in folded position.

5. A multipurpose foldable electric stove according to claim 1 wherein said tray is composed of aluminum.

6. A multipurpose foldable electric stove according to claim 3 wherein said pan is composed of aluminum.

7. A multipurpose foldable electric stove according to claim 1 wherein said grill is composed of stainless steel wire.

8. A multipurpose electric stove according to claim 1 wherein said foldable legs are composed of wire, each having its inner end wrapped about a bar of said grill to provide a hinge.

9. A multipurpose electric stove according to claim 8 wherein said wire extends beyond said wrapped-around hinge portion for providing a member coacting with a fixed member of said stove to provide a stop for limiting the unfolding motion of said legs.

10. A multipurpose electric stove according to claim 8 wherein the foldable legs respectively adjacent each end of the grill have a U configuration so that the bottom of the U is adapted to rest on a supporting surface when said tray is inverted with the legs in unfolded position, the inner ends of the legs of each U being wrapped about said bar of said grill as aforesaid to provide a hinge.

* * * * *